(12) United States Patent
Balasubramaniam

(10) Patent No.: US 11,652,792 B2
(45) Date of Patent: May 16, 2023

(54) ENDPOINT SECURITY DOMAIN NAME SERVER AGENT

(71) Applicant: Avast Software s.r.o., Prague (CZ)

(72) Inventor: Gandhi Balasubramaniam, Shalimar, FL (US)

(73) Assignee: Avast Software s.r.o., Prague (CZ)

( * ) Notice: Subject to any disclaimer, the term of this patent is extended or adjusted under 35 U.S.C. 154(b) by 189 days.

(21) Appl. No.: 16/668,861

(22) Filed: Oct. 30, 2019

(65) Prior Publication Data

US 2021/0136037 A1    May 6, 2021

(51) Int. Cl.
*H04L 9/40* (2022.01)
*H04L 61/4511* (2022.01)
*H04L 67/02* (2022.01)
*H04L 67/1036* (2022.01)
*H04L 61/59* (2022.01)

(52) U.S. Cl.
CPC ...... *H04L 63/0236* (2013.01); *H04L 61/4511* (2022.05); *H04L 63/0263* (2013.01); *H04L 63/1483* (2013.01); *H04L 63/20* (2013.01); *H04L 67/02* (2013.01); *H04L 67/1036* (2013.01); *H04L 61/59* (2022.05); *H04L 63/08* (2013.01)

(58) Field of Classification Search
CPC ............. H04L 63/0236; H04L 61/1511; H04L 63/1483; H04L 63/20; H04L 63/0263; H04L 61/6013; H04L 61/4511; H04L 61/59; H04L 67/1036; H04L 63/08; H04L 67/02
See application file for complete search history.

(56) References Cited

U.S. PATENT DOCUMENTS

| | | | |
|---|---|---|---|
| 6,968,389 B1* | 11/2005 | Menditto | H04L 61/4511 709/219 |
| 2007/0061887 A1* | 3/2007 | Hoover | H04L 12/4675 726/26 |
| 2008/0109679 A1* | 5/2008 | Wright | H04L 63/20 714/37 |
| 2015/0264055 A1* | 9/2015 | Budhani | H04L 63/0281 726/4 |
| 2016/0308875 A1* | 10/2016 | Judge | H04L 63/20 |
| 2017/0310709 A1* | 10/2017 | Foxhoven | H04L 63/10 |
| 2018/0113807 A1* | 4/2018 | Foxhoven | G06F 12/0837 |
| 2019/0036871 A1* | 1/2019 | Lapidous | H04L 61/10 |

* cited by examiner

*Primary Examiner* — Cheng-Feng Huang
(74) *Attorney, Agent, or Firm* — Avek IP, LLC; William B. Kircher

(57) ABSTRACT

A network is secured by managing domain name requests such that client devices are restricted from visiting malicious or undesirable domains. An endpoint Domain Name Server (DNS) agent is installed on client devices on a local network, and the endpoint DNS agents intercept DNS requests from the client devices and process the received DNS request in the endpoint DNS agent based on a security policy set for the client device via the endpoint DNS agent. In a further example processing the received DNS request comprises identifying the client device, end user, and the DNS request to a cloud-based DNS server, and processing a response received from the cloud-based DNS server received in response to the DNS request. The endpoint DNS agent is further operable to distinguish between DNS requests for local domains and remote domains, and to redirect DNS requests for local domains to a local network DNS server.

12 Claims, 5 Drawing Sheets

ENDPOINT SECURITY DOMAIN NAME SERVER AGENT

FIELD

The invention relates generally to computer network security, and more specifically to endpoint security using a domain name server (DNS) agent.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, security appliances can use sophisticated techniques such as ARP spoofing or DNS redirection to monitor or control the content that is delivered to client devices on a private network, protecting the client devices from malicious websites and other online threats.

For example, a firewall in a home or office may restrict the types of connection and the data that can be transferred between the internal network and an external or public network such as the Internet, based on firewall rules and characteristics of known malicious data. Security devices such as a firewall are typically computerized network devices that inspect network traffic that passes through, permitting passage of desirable network traffic while blocking undesired network traffic based on a set of rules. A network security device may be integrated into a home or small business router, or may be a standalone device such as a device connected to a router and configured to filter traffic coming into a private network from a public network before forwarding it to devices on the private network. In another example, the security device restricts computers on the private network from visiting risky or undesirable web addresses by directing requests to a particular domain name by implementing a local or proxy Domain Name Server (DNS) that selectively translates domain names into IP addresses for various network content requests.

In a more detailed example of a security device employing a DNS server, the security device acts as the domain name server for client devices on the private or local network, and redirects or blocks domain name requests for risky or undesirable content. The DNS server may be hosted locally within the private network, or may be part of a cloud-based security system. While a cloud-based solution eliminates the need for a homeowner or business user to purchase and configure DNS hardware, it becomes difficult for the cloud-based DNS server to distinguish between clients in the private network because private network clients' IP addresses are typically masked by the firewall or gateway using network address translation (NAT). Because cloud-based security solutions can't distinguish between devices or users, it can be difficult to configure different permissions for different users or accurately log threats encountered by different users or systems.

It is therefore desirable to manage cloud-based DNS service to provide greater security and functionality for client devices on a protected network.

SUMMARY

In one example embodiment, a network is secured by managing domain name requests such that client devices are restricted from visiting malicious or undesirable domains. An endpoint Domain Name Server (DNS) agent is installed on client devices on a local network, and the endpoint DNS agents intercept DNS requests from the client devices and process the received DNS request in the endpoint DNS agent based on a security policy set for the client device via the endpoint DNS agent. In a further example processing the received DNS request comprises identifying the client device and the DNS request to a cloud-based DNS server, and processing a response received from the cloud-based DNS server received in response to the DNS request.

In another example, the endpoint DNS agent is further operable to distinguish between DNS requests for local domains, or systems behind a firewall or router, and systems outside the firewall or router, and to redirect DNS requests for local domains to a local network DNS server In a further example, a user of the client device can elect to override a DNS redirection returned in response to the DNS request, such as by entering credentials. In another example, overridden DNS redirections are routed through a tunnel server operable to selectively filter malicious or undesirable content from the domain before forwarding requested content to the client device.

The details of one or more examples of the invention are set forth in the accompanying drawings and the description below. Other features and advantages will be apparent from the description and drawings, and from the claims.

DETAILED DESCRIPTION

Figure 1:
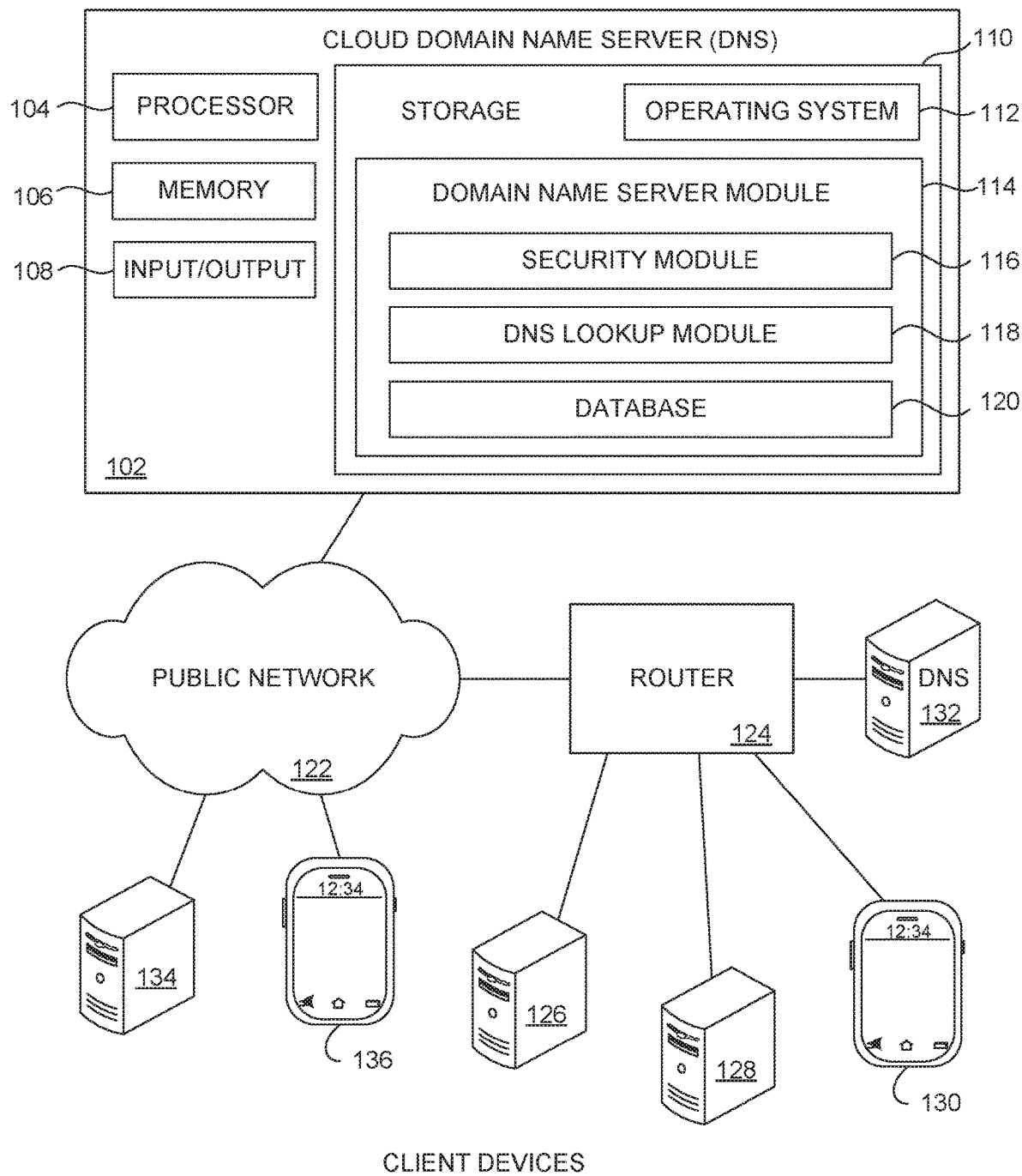
FIG. 1 is a diagram of a computer network including endpoint DNS agents and a cloud DNS server, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common documents are all frequently infected with malware of various types, and so users rely on tools such as antivirus software or other malware protection tools to protect their computerized devices from harm.

An increasing number of computerized devices such as home appliances, vehicles, and other devices (known collectively as the Internet of Things, or IoT) are connected to public networks and are also susceptible to unauthorized interception or modification of data. For example, many popular security cameras are known to have vulnerabilities through which attackers can access the device without authorization, enabling the attackers to view and record image data from the cameras or to control camera operation. Similar vulnerabilities are known to exist or may exist in other computerized devices, including network-connected home security systems such as electronic locks, home appliances such as smart thermostats or kitchen appliances, and vehicles with network access. These potential security risks extend to a wide variety of other environments and applications including commercial applications such as manufacturing monitoring and control systems, medical and health care devices used to diagnose or treat medical conditions, and infrastructure monitoring and control such as bridges, railways, wind farms, and the like.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. In other examples, cloud-based services monitor and control traffic to and from a private network, such as by using a custom domain name server (DNS) that blocks or redirects private network client attempts to access malicious or undesirable data.

Cloud-based service such as DNS servers can therefore be leveraged by multiple private networks, and are provided and maintained by a service provider rather than by the private network administrator, reducing cost and complexity of building a private network. A cloud-based DNS server typically looks at the WAN or wide-area network IP address of the router or gateway to the private network to determine which network is sending a request to apply any policies or services unique to the requesting network, and to manage subscription coverage. While such a system works well for applying the same policies to each client device on a private network, it does not distinguish between different private network clients and in many configurations cannot distinguish between clients due to Network Address Translation (NAT) in the router or gateway that masks the clients' individual IP addresses. Further, the cloud security service is unable to log which devices or users made individual WAN network requests, as they cannot be distinguished in a typical cloud-based security service environment.

Some example embodiments described herein therefore seek to provide improved device-level security for network client devices behind a firewall or gateway by using a DNS agent on the client device. In a further example, the DNS agent on the client device receives at least part of its configuration used to selectively redirect DNS requests from a remote system, such as a cloud-based DNS security server.

In a more detailed example, an endpoint Domain Name Server (DNS) agent is installed on a client device on a local network, and is operable to receive and process DNS requests from the client device. The endpoint DNS agent processes received DNS requests based on a security policy set for the client device via the endpoint DNS agent, such as a policy received from a cloud security service such as a cloud DNS server or set by a user or administrator of the client device. The endpoint DNS agent identifies the client device (such as a device ID or user ID) and the DNS request to a cloud-based DNS server, and receives a response from the server comprising an IP address associated with the domain name comprising part of the DNS request or another response indicating the requested domain is a security risk. In further examples, the endpoint DNS agent is operable to work outside a private network, and to route requests for systems on a local network to a local DNS server.

FIG. 1 is a diagram of a computer network including endpoint DNS agents and a cloud DNS server, consistent with an example embodiment. Here, a cloud Domain Name Server (DNS server) 102 comprises a processor 104, memory 106, and input/output 108 such as a network connection. The server also includes storage 110, which stores data such as machine-readable instructions executable on processor 104 to perform various functions. These instructions or software include operating system 112, as well as domain name server module 114. The domain name server module is operable to respond to DNS requests from client computers if the requested domain is not determined to be a risky domain via security module 116, the response comprises an IP address associated with a received domain name, determined by using DNS lookup module 118 to search a database 120 for the IP address associated with the domain name request.

Public network 122 links the client domain name server 102 to various client devices, and to router or gateway 124. The router 124 links client devices such as computers 126 and 128, smart phone 130, and local domain name server 132 to the public network 122, and routes traffic between the client devices on the local network and the public network. This is achieved in part by translating local network addresses that only work on the local network to addresses that can be addressed on the public network using Network Address Translation, or NAT, which maps IP addresses in one address space such as the local network to one or more addresses in a public address space. Where many client devices are mapped to a single Wide Area Network or WAN IP address, other characteristics of individual data flows between devices such as port numbers are used to track the individual data streams and ensure the router sends data from the public network to the correct local network client device. In this example, one or more devices that often attach to the local network via router 124 will also connect to the public network directly, such as laptop computer 134 and smart phone 136. The client devices 126, 128, 130, and 134, 136 each also execute an endpoint Domain Name Server (DNS) agent, which is operable to manage DNS requests.

In operation, the client devices execute endpoint DNS agents that receive or intercept DNS requests from other software, and process the requests to selectively return an IP address associated with the requested domain or other information. This enables the endpoint DNS agents to decline to provide an IP address for domains known or suspected to contain malicious or otherwise undesirable content, or to provide an IP address along with an indication of known or suspected risks associated with the domain. Processing a received DNS request comprises evaluating the DNS request to determine whether it is for a local network domain or for an external domain on the private network, such that requests for local network domains are routed to a local domain network server (DNS server) 132. DNS requests for external domains are selectively forwarded to the cloud domain name server 102, which is operable to look up and return IP addresses for domains on the public network, and to return an indication that a website may be malicious, undesirable, or otherwise selected for special treatment by the cloud domain name server's security module 116.

In a further example, the endpoint DNS agent is operable to receive a security policy such as from the cloud domain name server, which may be set by an administrator of the local network or the client device. The policy contains information such as a whitelist of allowed domains, a blacklist of blocked domains, internal DNS server information for local domains such as local domain server 132, a cache of domain names and associated IP addresses, alerting rules for accessing blocked or otherwise undesired domains, and the like. The endpoint DNS agent and/or the cloud domain server in another example are operable to log DNS requests, or to log DNS requests meeting certain criteria such as requests for malicious or undesirable web domains.

In another example, DNS requests for websites or other online content that are identified as potentially malicious but not known to be malicious are routed through an external tunnel server by providing the client device the tunnel server's IP address rather than the destination IP address. The external tunnel server is then operable to receive content requests from the client and forward them to the destination IP address, and to receive content from the destination IP address and inspect it for malicious content before selectively forwarding the received content to the client. The external tunnel server thereby acts as a "man in the middle" between the client device and the destination device, filtering out content that may be harmful or undesirable to the client device.

Some communication protocols, such as the User Datagram Protocol (UDP), are considered stateless in that they do not have as much overhead as other protocols and lack features such as handshaking to set up a communication channel, out-of-order handling, and error correction. Some features such as error correction can still be handled via the communicating applications, while other applications such as telephony may simply drop packets with errors in the interest of avoiding retransmission delays. The domain name system typically relies on the simple stateless nature of UDP to communicate DNS requests and responses, with some systems using TCP as a fallback when a UDP response to a DNS request exceeds 512 bytes. Using UDP for DNS requests also means that the request and response are unsecure, and not extensible to carry user data, such as identifying specific users or devices in a private network. The endpoint DNS agent examples described in the examples herein address these and other issues with the traditional DNS system.

Figure 2:
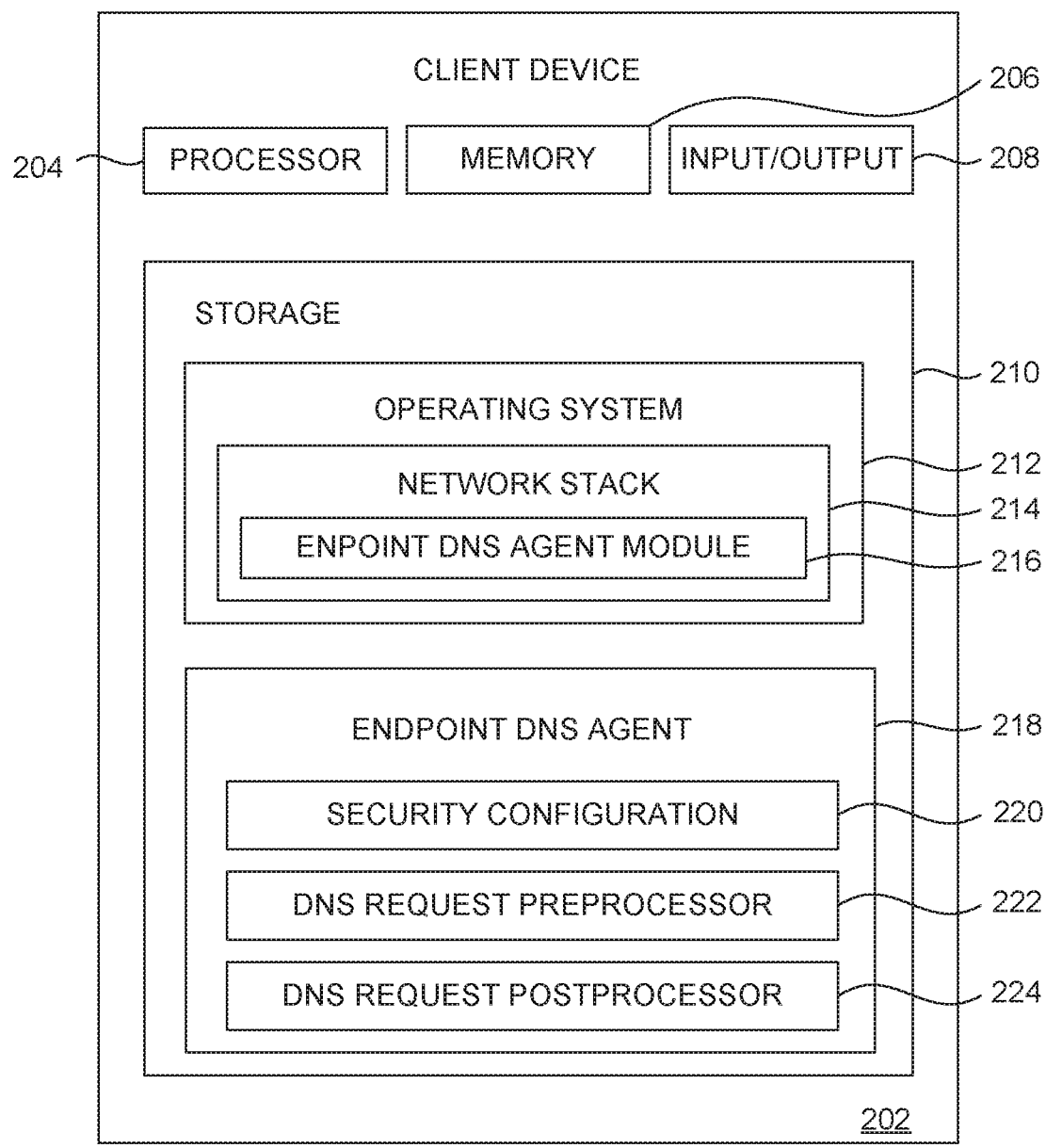
FIG. 2 is a block diagram of a client device having an endpoint DNS agent, consistent with an example embodiment.

FIG. 2 is a block diagram of a client device having an endpoint DNS agent, consistent with an example embodiment. Here, a client device 202 includes a processor 204, a memory 206, and input/output 208 such as a network interface. The device also includes storage 210, which stores instructions for execution on the processor such as operating system 212 and endpoint DNS agent 218. The operating system includes various modules that help software such as the endpoint DNS agent interface with the hardware in the client device, such as network stack 214 that provides an interface to the client device's network hardware. In this example, the network stack is modified with an endpoint DNS agent module 216 that helps the endpoint DNS agent 218 intercept or redirect DNS requests.

The endpoint DNS agent 218 in this example includes various functional groups or modules, including security configuration module 220, DNS request preprocessor 222, and DNS request postprocessor 224. The security configuration module is operable to set security configuration or policy for the device, including communicating with a remote or cloud security server to receive and implement security configuration information set by an administrator. For example, the administrator may configure the security configuration module to allow a user to bypass various restrictions on visiting potentially malicious or undesirable websites, or to redirect certain local domain requests to a local domain server rather than a cloud domain server.

DNS requests in the client device are captured by the endpoint DNS agent module 216, and routed to DNS request preprocessor 222 in the endpoint DNS agent. The DNS request preprocessor receives a DNS request that includes the domain name (for example, Google.com) of a network system to which the client device wishes to connect, such as to visit a web page. The preprocessor is operable to check if an IP address for the domain name is already cached, such that asking a remote device for the domain name's associated IP address is unnecessary, or if the domain name is for a local domain and the request should be routed to a local DNS server such as DNS server 132 of FIG. 1. In this example, if the domain name request meets neither of these criteria, it is forwarded to a cloud domain name server such as 102 of FIG. 1.

The cloud domain name server returns a response that includes in this example the IP address of the requested domain, and in various further examples the IP address of a proxy, an indication of whether the domain is blocked, an indication of why a blocked domain is blocked, and other such information. In a more detailed example, a request for "thepiratebay.org" may return an IP address such as 162.159.138.79, along with an indication that the website is blocked due to frequent distribution of copyrighted or pirated material and malware, and a proxy or tunnel IP address of 5.62.48.97. The DNS request postprocessor 224 indicates to the user that the reply from the cloud DNS server indicates that the site is blocked, in a further example indicates why the website is blocked and gives the user the option to go to the site anyway for legitimate purposes. The user elects to visit the site anyway, and the user is directed to the tunnel IP address of 5.62.48.97, to a proxy server that acts as a "man in the middle" between the client device and the requested website. The proxy server is then operable to forward requests and replies between the client device and the website, electively filtering out content that is undesirable or believed to be malicious.

The endpoint DNS agent 218 is further operable to cache DNS entries in some examples, eliminating the need to re-request an IP address for repeated requests to the same domain. A local DNS server such as DNS server 132 of FIG. 1 is also used in some examples to resolve local domains, such as domains internal to a company network. In a more detailed example, a domain request is intelligently routed to either the cloud DNS server or the local DNS server based on the domain name, or in some embodiments is sent to both for resolution. While requests to the cloud DNS server are typically sent via TCP, local DNS requests are in many examples sent using the typical UDP format with no modification. In another example, requests that cannot be resolved by the cloud DNS server are sent to the local DNS server in addition to domains known to be local. The DNS request postprocessor in a further example is operable to handle DNS queries that cannot be resolved, such as to return an error to the user, and to manage backup methods such as reversion to a traditional DNS system when the cloud DNS server can't be reached.

The security configuration 220 is in some examples tied to the client device, such as based on the client device's MAC address, local IP address, identifier associated with the endpoint DNS agent, or other identifying characteristic. In another example, the configuration is tied to the user, such that different users logged in to the same client device may experience different security policies based on factors such as their role within an organization. The security configuration in this example is set by a client device administrator via the cloud DNS server, but in other examples is set via direct communication with the client device or is set or altered by a user of the client device.

In a typical example of a use case, a system administrator for a company creates an account with the cloud DNS provider, such as Avast's Secure Web Gateway Service. The administrator preconfigures policies for different users, groups of users, and devices, identifies local domain name servers, and whitelists certain domains while blocking other domains deemed inappropriate or undesirable. He also configures credentials for certain users such as managers or administrators to override blocked network content. The endpoint DNS agent is then installed on client devices, and connects with the cloud DNS server to receive the security policy or settings associated with the device or user. In the network stack, the endpoint DNS agent installs an endpoint DNS agent module operable to intercept DNS requests, or in a more detailed example sets the device's own IP address as the DNS server and configures the endpoint DNS agent to receive and process intercepted DNS requests.

Figure 3:
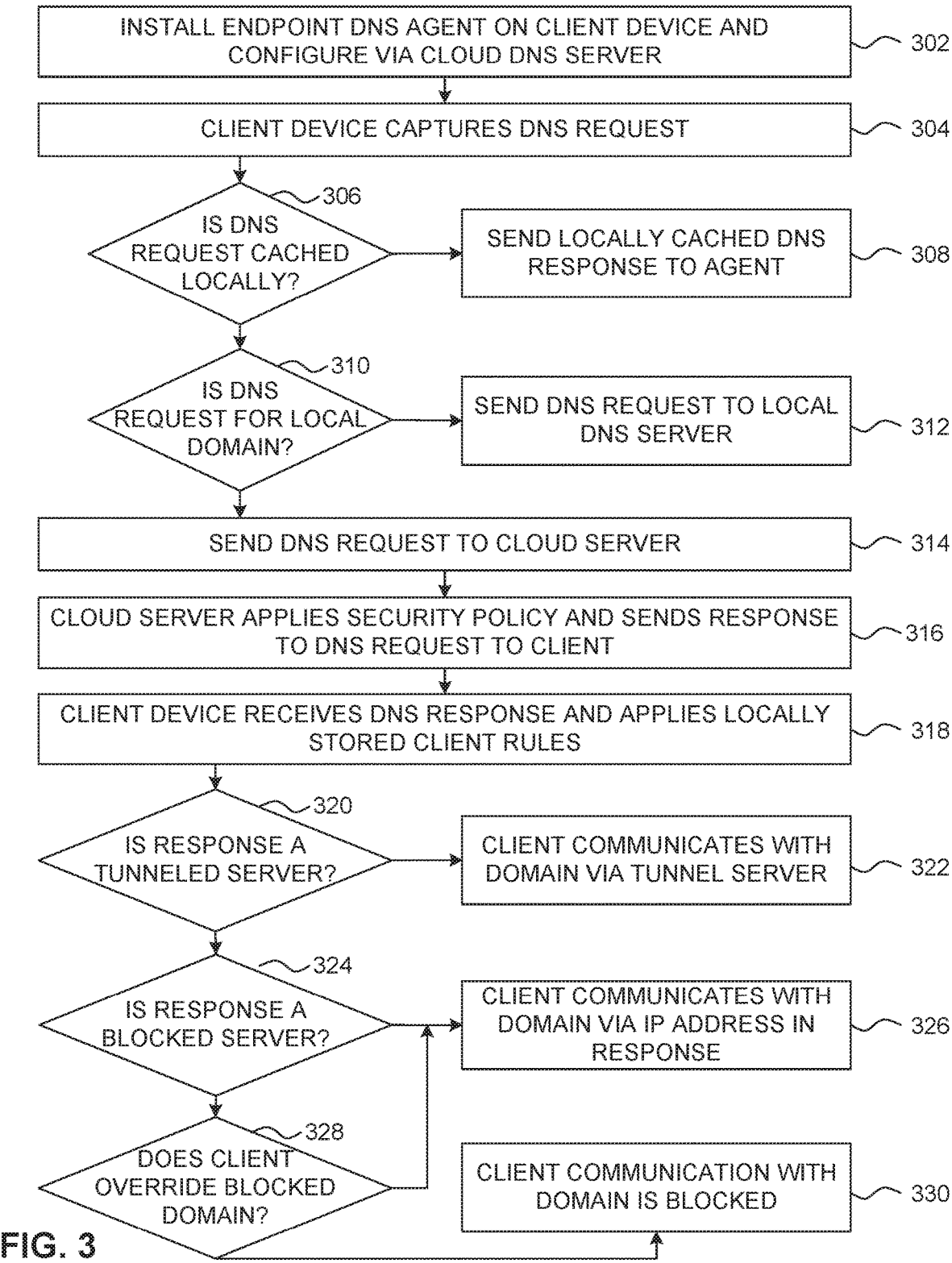
FIG. 3 is a flowchart of a method of processing a DNS request in a system having client devices with endpoint DNS agents, consistent with an example embodiment.

FIG. 3 is a flowchart of a method of processing a DNS request in a system having client devices with endpoint DNS agents, consistent with an example embodiment. At 302, a device owner or administrator installs endpoint DNS agent software on a client device, and configures the client device via the cloud DNS server, such as setting permissions for the new client device or the user, or making the client device part of a policy group. Once installed and configured, the endpoint DNS agent is operable to capture DNS requests from the client device at 304, such as by designating the endpoint DNS agent as the default DNS server for the device. After a DNS request is captured, the endpoint DNS agent first checks whether the DNS request is cached locally at 306. If it is cached locally, a DNS response is sent from the local cache at 308. If the DNS request is not stored in the local cache, the endpoint DNS agent then determines whether the DNS request is for a domain that is configured or known to be a local domain at 310. If the domain is a local domain, the DNS request is forwarded to a local DNS server at 312.

If the DNS request is not cached locally and is not a request for a local domain, the DNS request is sent to a cloud server at 314, using a secure TCP connection established between the client device's endpoint DNS agent and the cloud DNS server. The cloud DNS server has endpoint DNS support software running on it to receive the specially-formatted DNS request, and apply security policies such as determining allowed and restricted domains or subject matter for different users, devices, or groups at 316. The cloud server sends a DNS response to the client, which is again sent over the secure TCP connection. The DNS response in this example comprises an IP address for the requested domain, along with other information such as whether the domain is restricted or blocked, and whether the provided IP address is for the requested domain itself or for a tunnel server configured to process material from the requested domain and filter malicious or otherwise undesirable content from being sent to the client device.

The client receives the DNS response at 318, and applies locally stored client rules to the response in processing the received response. For example, a DNS response containing an IP address but indicating the website is blocked may allow the user to enter credentials to unblock the website, while other domains may not be unblocked or may not require credentials to unblock. In some examples, the DNS response contains an IP address of a tunnel server in addition to or in place of the IP address of the domain requested, such that client device communication with the domain is routed through the tunnel server so that the tunnel server can inspect traffic between the client device and the requested domain and filter or block any undesired or malicious traffic. This is shown at 320, where if the IP address provided is a tunnel server, the client device communicates with the domain via the tunnel server at 322.

If the requested domain IP address is not a tunnel server, the endpoint DNS agent determines whether the domain is blocked at 324. If the domain is not blocked, the client device is provided with the requested domain's IP address at 326, and the client device communicates with the requested domain. If the domain is blocked, the client may in some circumstances have the option to unblock the domain at 328, such that if the client unblocks the domain the client device exchanges network data with the requested domain at 326. If the client declines to unblock the domain or is not given the option to unblock the domain, client communication with the domain is blocked at 330.

This basic process is repeated as the client device requests additional domains, such as when a user browses the Internet using a web browser and visits different websites. In other examples, variations on the process shown in FIG. 3 will enable different or further functionality, such as more sophisticated handling of DNS requests. For example, in one further embodiment, if a DNS record is not found in the cloud DNS server, a response is sent to the client's endpoint DNS agent, which then checks with the local DNS server to see if it can resolve the requested domain name. In another example, if a user elects to unblock a domain that is blocked, such as by entering credentials to unblock the domain, the domain defaults to being accessed through a tunnel server that can scan and filter malware or other undesirable content rather than direct client device communication with the requested domain.

Figure 4:
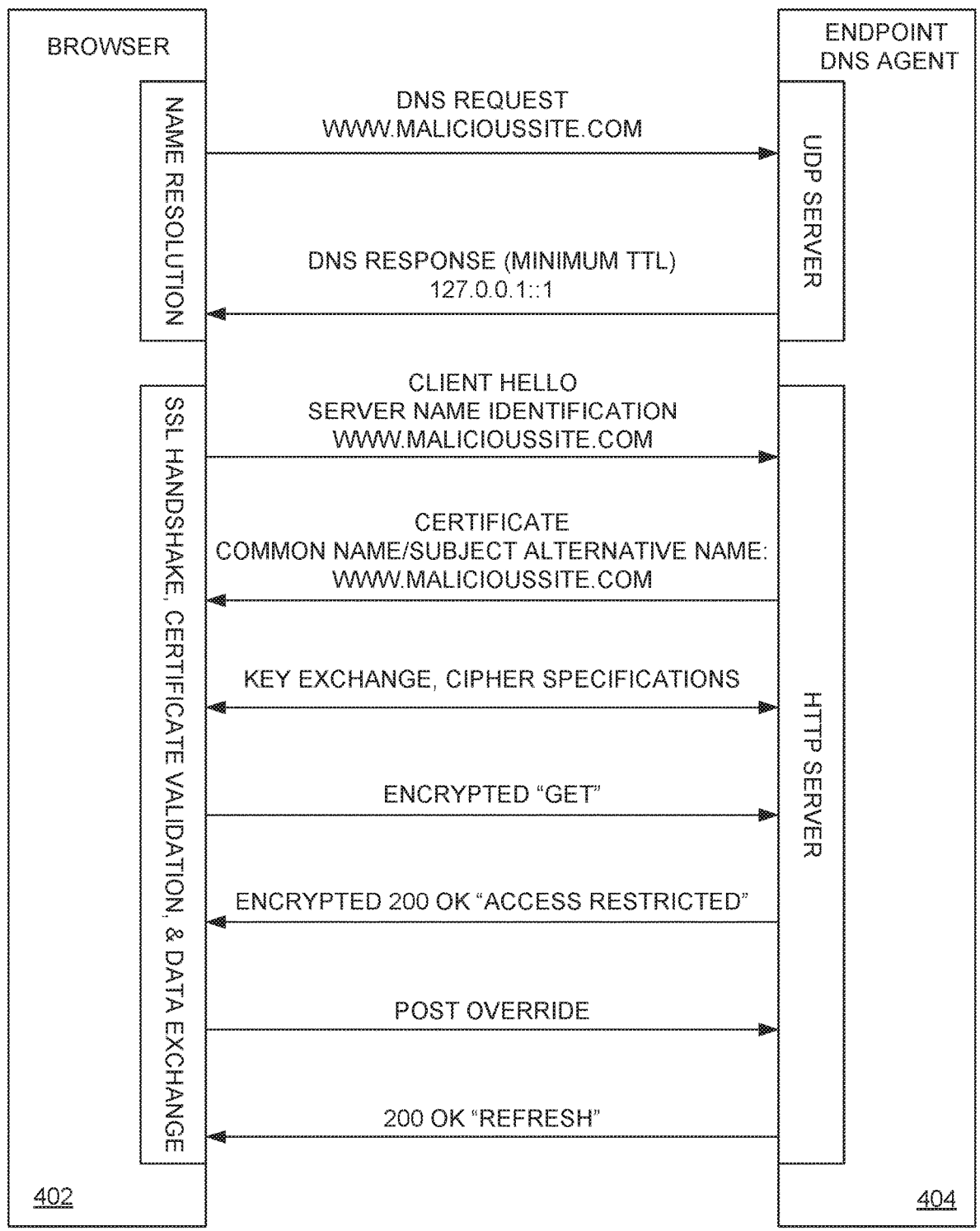
FIG. 4 is a block diagram illustrating using a host root certificate in the endpoint DNS agent, consistent with an example embodiment.

FIG. 4 is a block diagram illustrating using a host root certificate in the endpoint DNS agent, consistent with an example embodiment. When an endpoint client attempts to access a secure site, the client will receive a message stating that the certificate is invalid because the secure endpoint DNS agent's redirection of the DNS request interferes with the SSL handshake process between the browser and the remote server. To resolve this in one example embodiment, a service provider's root certificate is stored to the client device's system store when the endpoint DNS agent is installed, and a local server is hosted to assist with domain name resolutions.

Referring to the data exchange diagram of FIG. 4, when a client 402's web browser attempts to visit a site that is known to the endpoint DNS agent 404 to be potentially malicious, the DNS request sent to the endpoint agent's UDP server results in a DNS response containing a localhost IP address (typically 127.0.0.1) to the browser. The browser will then attempt to communicate with a TCP server hosted on the identified IP address using common ports such as port 80 or 443, which due to the localhost IP address returned in the previous step is directed to the client machine itself rather than to a remote server. The first such communication is a "Client Hello" message from the browser to the HTTP server, with a Server Name Identification (SNI) tag identifying the website with which the browser wishes to communicate. The endpoint DNS agent's HTTP server returns a certificate having a Common Came (CN) and/or Subject Alternative Name (SAN) that matches the domain request identified in the Server Name Identification tag, signed by the security service provider's root certificate. The browser then performs a key exchange and establishes an SSL connection with the HTTP server on the endpoint DNS agent.

In a more detailed example, the "Client Hello" message from the browser 402 includes information such as a random byte string for establishing a secure connection, the SSL version or versions the browser supports, and the compression methods and ciphers it supports. The endpoint DNS agent 404's server response includes the chosen compression and cipher algorithms, SSL version, and its own random character string. The random character strings are used along with exchanged public keys to establish a secure connection, over which a shared key is established for more efficient ongoing communication during a session.

Once a secure connection has been established between the browser 402 and the endpoint DNS agent 404's HTTP server, the browser sends a "Get" request to the HTTP server for the web page content on the secure domain. Because the domain has been identified as potentially malicious by the security software, the endpoint DNS agent replies with an HTTP 200 message indicating that access to the requested content is restricted. If the user elects to override the restriction, such as by entering a password or clicking a button to override the restriction, a Post Override message is sent from the browser to the HTTP server, and the HTTP server refreshes the content sent to the browser with content from the requested domain.

The various methods described herein therefore provide the benefit of being able to use a cloud-based DNS server to provide security to client devices in a private network, such as those behind a firewall or gateway that are masked from the public network by network address translation. The cloud-based DNS server works with an endpoint DNS agent installed on the client devices to enforce policies based on the user, device, or group, and can effectively block malicious or undesirable domains, block the domains with a user right to override, or provide access to the domains through a tunnel that is operable to filter select undesirable content from the domain. This enables the cloud DNS server and endpoint DNS agent to provide a high level of up-to-date security and protection to the client devices, both when hidden behind a gateway or firewall and when traveling throughout the public network. Although the examples shown here are implemented using certain computerized devices, other computerized devices, software, and combinations will be used to achieve similar results in other embodiments. One such example is illustrated below.

Figure 5:
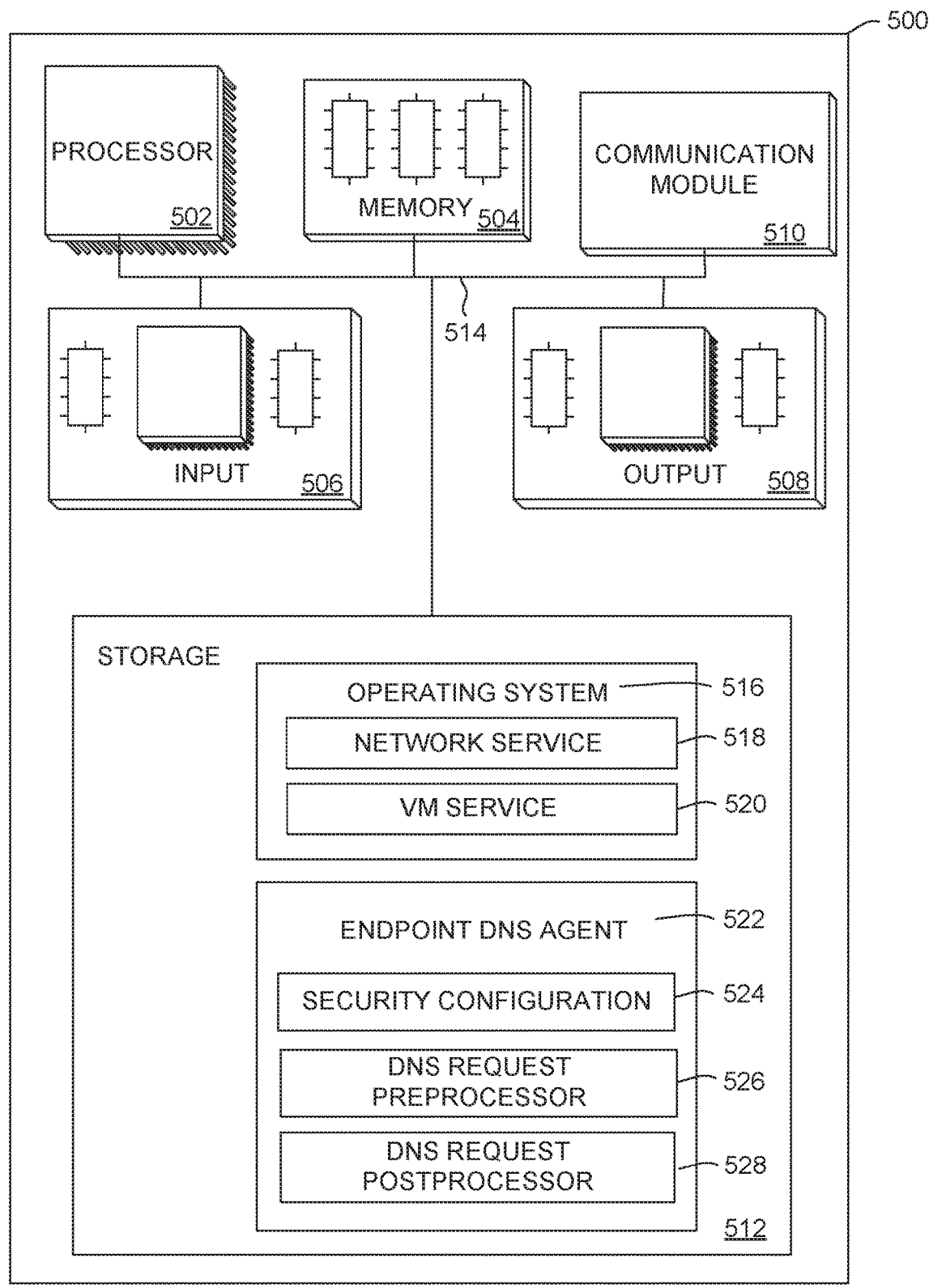
FIG. 5 is a computerized network device, consistent with an example embodiment.

FIG. 5 is a computerized network device, consistent with an example embodiment. FIG. 5 illustrates only one particular example of network device 500, and other computing devices may be used in other embodiments. Although network device 500 is shown as a standalone computing device, device 500 may be any component or system that includes one or more processors or another suitable computing environment for executing software instructions in other examples, and need not include all of the elements shown here.

As shown in the specific example of FIG. 4, network security device 500 includes one or more processors 502, memory 504, one or more input devices 506, one or more output devices 508, one or more communication modules 510, and one or more storage devices 512. Device 500 in one example further includes an operating system 516 executable by network security device 500. The operating system includes in various examples services such as a network service 518 and a virtual machine service 520 such as a virtual server or various modules described herein. One or more applications, such endpoint DNS agent 522 are also stored on storage device 512, and are executable by network security device 500.

Each of components 502, 504, 506, 508, 510, and 512 may be interconnected (physically, communicatively, and/or operatively) for inter-component communications, such as via one or more communications channels 514. In some examples, communication channels 514 include a system bus, network connection, inter-processor communication network, or any other channel for communicating data. Applications such as endpoint DNS agent 522 and operating system 516 may also communicate information with one another as well as with other components in device 500.

Processors 502, in one example, are configured to implement functionality and/or process instructions for execution within computing device 500. For example, processors 502 may be capable of processing instructions stored in storage device 512 or memory 504. Examples of processors 502 include any one or more of a microprocessor, a controller, a digital signal processor (DSP), an application specific integrated circuit (ASIC), a field-programmable gate array (FPGA), or similar discrete or integrated logic circuitry.

One or more storage devices 512 may be configured to store information within network security device 500 during operation. Storage device 512, in some examples, is known as a computer-readable storage medium. In some examples, storage device 512 comprises temporary memory, meaning that a primary purpose of storage device 512 is not long-term storage. Storage device 512 in some examples is a volatile memory, meaning that storage device 512 does not maintain stored contents when network security device 500 is turned off. In other examples, data is loaded from storage device 512 into memory 504 during operation. Examples of volatile memories include random access memories (RAM), dynamic random access memories (DRAM), static random access memories (SRAM), and other forms of volatile memories known in the art. In some examples, storage device 512 is used to store program instructions for execution by processors 502. Storage device 512 and memory 504, in various examples, are used by software or applications running on network security device 500 such as endpoint DNS agent 522 to temporarily store information during program execution.

Storage device 512, in some examples, includes one or more computer-readable storage media that may be configured to store larger amounts of information than volatile memory. Storage device 512 may further be configured for long-term storage of information. In some examples, storage devices 512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network security device 500, in some examples, also includes one or more communication modules 510. Computing device 500 in one example uses communication module 510 to communicate with external devices via one or more networks, such as one or more wireless networks. Communication module 510 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, network security device 500 uses communication module 510 to communicate with an external device such as via public network 122 of FIG. 1.

Network security device 500 also includes in one example one or more input devices 506. Input device 506, in some examples, is configured to receive input from a user through tactile, audio, or video input. Examples of input device 506 include a touchscreen display, a mouse, a keyboard, a voice-responsive system, a video camera, a microphone, or any other type of device for detecting input from a user.

One or more output devices 508 may also be included in computing device 400. Output device 508, in some examples, is configured to provide output to a user using tactile, audio, or video stimuli. Output device 508, in one example, includes a display, a sound card, a video graphics adapter card, or any other type of device for converting a signal into an appropriate form understandable to humans or machines. Additional examples of output device 508 include a speaker, a light-emitting diode (LED) display, a liquid crystal display (LCD), or any other type of device that can generate output to a user.

Network device 500 may include operating system 516. Operating system 516, in some examples, controls the operation of components of network security device 500, and provides an interface from various applications such as endpoint DNS agent 522 to components of network security device 500. For example, operating system 516, in one example, facilitates the communication of various applications such as endpoint DNS agent 522 with processors 502, communication unit 510, storage device 512, input device 506, and output device 508. Applications such as endpoint DNS agent 522 may include program instructions and/or data that are executable by computing device 500. As one example, endpoint DNS agent 522 provides security for the network device 500 by using security configuration 424 and DNS request preprocessor 526 and postprocessor 528 to send DNS requests to a cloud DNS server and process responses in a way that blocks or redirects network content from domains that are risky or undesirable. These and other program instructions or modules may include instructions that cause network security device 500 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of securing network devices by managing Domain Name Server (DNS) requests, comprising:
    installing an endpoint Domain Name Server (DNS) agent on a client device on a local network;
    receiving a security policy from a cloud-based DNS server running endpoint DNS support software configured to communicate with the endpoint DNS agent;
    receiving a DNS request from the client device in the endpoint DNS agent;
    processing the received DNS request in the endpoint DNS agent based on the security policy set for the client device via the endpoint DNS agent, wherein processing the received DNS request comprises identifying the client device;
    sending the identified client device and the DNS request to the cloud-based DNS server, wherein the cloud-based DNS server is operable to return a response to the DNS request to the endpoint DNS agent; and
    wherein the endpoint DNS agent is operable to distinguish between DNS requests for systems behind a firewall or gateway and systems outside the firewall or gateway and to resolve local addresses behind the firewall or gateway and redirect DNS requests for systems behind the firewall or gateway to a local network DNS server.

2. The method of securing network devices by managing DNS requests of claim 1, wherein the response to the DNS request comprises: an IP address for the requested domain itself or an IP address for a tunnel server configured to process material from the requested domain.

3. The method of securing network devices by managing DNS requests of claim 1, wherein the returned response to the DNS request comprises an IP address associated with a domain name comprising part of the DNS request.

4. The method of securing network devices by managing DNS requests of claim 1, further comprising allowing a user of the client device to override a DNS redirection returned in response to the DNS request.

5. The method of securing network devices by managing DNS requests of claim 1, wherein the endpoint DNS agent is operable to process received DNS requests irrespective of whether the client device is behind a firewall or gateway.

6. A method of securing network client devices in a cloud-based DNS server, comprising:
   receiving a DNS request from an endpoint Domain Name Server (DNS) agent on a client device on a local network, the DNS request comprising a domain name and a client identity;
   running, on the cloud-based DNS server, endpoint DNS support software configured to communicate with the endpoint DNS agent;
   processing the received DNS request in compliance with a security policy associated with the client identity to generate a result, wherein the security policy set via the DNS agent it received from a cloud-based DNS server;
   sending a reply comprising the result to the endpoint DNS agent on the client device; and
   wherein the endpoint DNS agent is operable to distinguish between DNS requests for systems behind a firewall or gateway and systems outside the firewall or gateway and to resolve local addresses behind the firewall or gateway and redirect DNS requests for systems behind the firewall or gateway to a local network DNS server.

7. The method of securing network client devices in a cloud-based DNS server of claim 6, wherein the reply comprises at least one of an IP address associated with the domain name, and a response indicating the requested domain name is a security risk.

8. The method of securing network client devices in a cloud-based DNS server of claim 6, wherein the client identity comprises at least one of an identity of the client device and an identity of a user of the client device.

9. The method of securing network client devices in a cloud-based DNS server of claim 6, wherein the security policy is set via an administrator of the client device.

10. The method of securing network client devices in a cloud-based DNS server of claim 6, wherein the cloud-based DNS server is operable to receive requests from the client device and respond to such requests irrespective of whether the client device is behind a firewall or gateway.

11. A network client device comprising an endpoint DNS agent, comprising:
   a hardware processor and a hardware memory; and
   an endpoint Domain Name Server (DNS) module comprising instructions executable on the hardware processor of the client device, the endpoint DNS module operable to receive a DNS request from the client device and process the received DNS request based on a security policy set for the client device via the endpoint DNS agent, wherein the security policy set via the DNS agent is received from a cloud-based DNS server and wherein processing the received DNS request comprises identifying the DNS request and at least one of a client device identity and a client device user identity to the cloud-based DNS server operable to return and response to the DNS request; and
   wherein the endpoint DNS module is operable to distinguish between DNS requests for systems behind a firewall or gateway and systems outside the firewall or gateway and to resolve local addresses behind the firewall or gateway and redirect DNS requests for systems behind the firewall or gateway to a local network DNS server.

12. The network client device comprising an endpoint DNS agent of claim 11, wherein the endpoint DNS agent is further operable to process received DNS requests irrespective of whether the client device is behind a firewall or gateway.

* * * * *